Patented Oct. 8, 1929

1,730,576

UNITED STATES PATENT OFFICE

FRED R. KLAUS AND FRANK H. MEYER, OF WARREN, OHIO, ASSIGNORS TO THE AMERICAN WELDING AND MANUFACTURING COMPANY, OF WARREN, OHIO, A CORPORATION OF OHIO

CUSHION-TIRE STRUCTURE

Application filed June 24, 1922. Serial No. 570,615.

This invention relates to tire structures and appertains more particularly to cushion tires of the type in which a tire with an inner recess or channel is moulded and cured directly upon a tire base.

In cushion tire structures of this type it has heretofore been customary to provide apertures in the tire base or rim through which the core forming the recess is removed after the tire has been cured on the base. Such tire base structures, however, are open to serious objection for the reason that the numerous apertures in the base leave only relatively small connectors between the side sections and they are liable to move relative to each other and become distorted in service or in applying the high pressure customarily used to force them laterally upon the fixed rim of a wheel. Furthermore such structures necessitate making the tire core in numerous sections and the removal of the short sections of core through the rim apertures is a tedious operation.

It is an object of the present invention to provide a cushion tire structure of the air cushion type, in which the base or rim has as much strength as a continuous integral rim and which can be forced laterally upon the fixed rim of a wheel without deformation.

A further object is to provide a method of forming cushion tire structures of this type in which fewer core sections are required and in which the insertion and removal of the core sections are simplified.

A further object is to provide a cushion tire structure in which an endless ring is expanded or stretched into and interlocks with side sections having a tire structure secured thereto, to form with said side sections a rigid base.

A further object is to provide a method of forming a tire base in which the inherent resiliency of the tire base sections may be utilized, if desired, to maintain the parts in firm engagement.

Another object of the invention is to provide a cushion tire structure which can be forced upon the fixed rim of a wheel structure without deformation or alteration in shape other than the obviously necessary stretching or expansion, it being well-known that the wheel structure is usually slightly larger in diameter than the inside diameter of the cushion tire structure. Throughout substantially its entire width and circumference the cushion tire structure will have a frictional engagement with, or due to its substantially uniform resistance to expansion, a pressure will be exerted substantially throughout its inner face upon the fixed rim of the wheel structure.

Other objects will be apparent from the following description and annexed drawings.

Reference should be had to the accompanying drawings forming a part of this specification in which—

Fig. 5 is a sectional view of the finished article.

Figure 1:
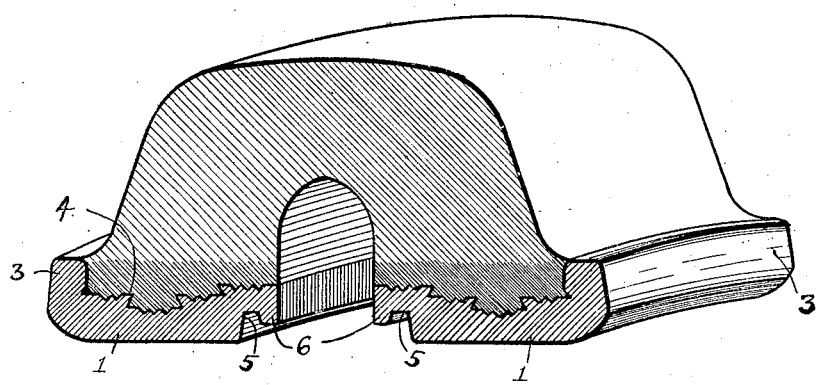
Figure 1 is a sectional view showing a tire moulded upon spaced side rings.
Figure 2:
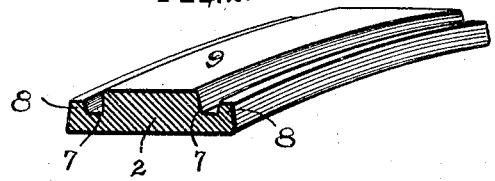
Fig. 2 is a perspective view of the center ring.

Referring to the annexed drawings, Figure 5 shows the finished article in which the tire base is made up of a pair of annular side sections 1, preferably endless, and a ring 2, preferably endless. The side sections 1 are each provided with an outturned flange 3 on the outer edge, and peripheral rubber locking grooves 4 upon their outer faces. At their inner edges the sections 1 are rabbeted on the inside circumferentially and grooved, as at 5, along the shoulder of the rabbet to form circumferentially depending inner ribs 6 at their adjacent edges. The ring 2 is grooved circumferentially at 7 at its edges on the outside thereof, thus providing a rib 8 at each side. The ribs 8 of the ring 2 fit in the grooves 5 of the side sections, and the ribs 6 of the side sections fit in the grooves 7 of the ring 2. The central portion 9 of the outside of the ring 2 fits between the edges of the section 1 and the inner periphery of the ring 2 is preferably substantially flush with the inner peripheries of the side sections.

The side sections with the intermediate endless ring form a circumferentially continuous imperforate tire base, which has ample strength to resist distortion in service or from lateral pressure while being forced onto the fixed rim of a wheel.

In forming the cushion tire structure, the body of the tire and the hard rubber layer, if desired, is built up in the usual manner, after a suitable core is inserted between the side sections 1 of the base to form the inner recess or air channel 10, when the tire body is cured or vulcanized. After the curing of the tire, an unobstructed space is provided between the side sections of the tire base, so that there is no difficulty in removing the core which can be made in two or three sections or whatever number of sections is most convenient.

After the tire is formed on the side sections of the base, and the core sections have been removed, the ring 2 is put in place, as hereinafter described, to complete the tire base and form a rigid structure. The ring 2 is preferably formed originally of an external diameter slightly less than the internal diameter of the base sections 1, so that it can be slipped freely inside the base.

Figure 3:
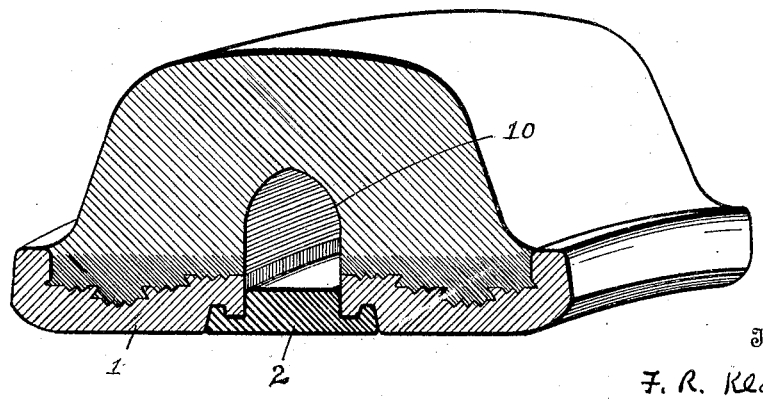
Fig. 3 is a front elevation showing diagrammatically an expanding machine with the tire, tire base sections, and locking ring in place thereon, preparatory to the expanding of the locking ring into locking engagement.
Figure 3:
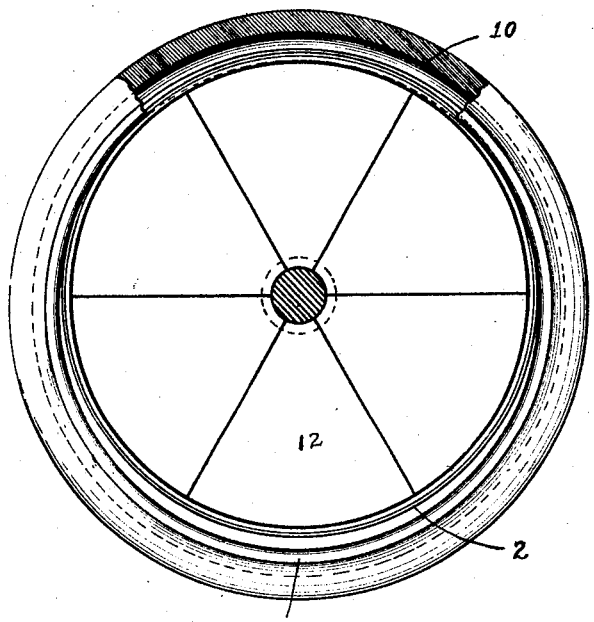
Figure 4:
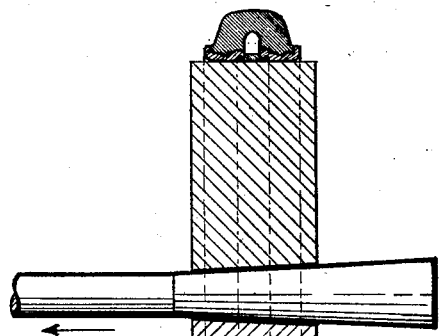
Fig. 4 is a sectional view showing diagrammatically a portion of the expanding machine with the tire base and locking ring thereon.
Figure 6:
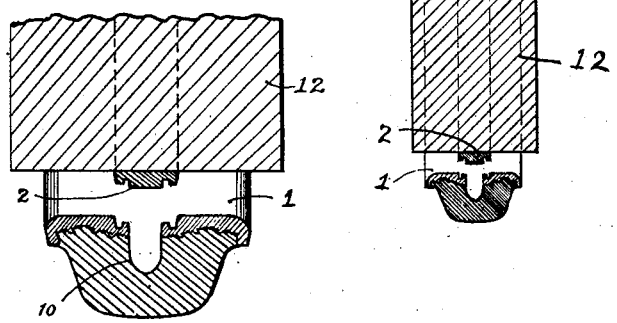
Fig. 6 is an enlarged view of the lower part of Fig. 4.

As shown in Figs. 3 and 4, the ring 2 is inserted within the sections 1 with the ribs 5 and 6 interfitting at one side of the tire base, and placed upon the expanding segmental die 12 (diagrammatically shown) of an expanding machine which is designed to exert uniform outward radial pressure upon a ring placed thereon. The ring 2 is then expanded until it is forced into close fit throughout its entire circumference with the sections 1, the interfitting flanges or ribs 6 and 8 serving as guides to hold the rings in proper alinement during the expanding operation. The ring 2 and the side sections thus provide a construction in which the ring and side sections are not only rigidly connected throughout their peripheral edges but are actually in stressed condition, thus substantially resisting relative circumferential movement when mounted for use upon the fixed rim of a wheel body.

If it be desired to increase the relative stressing of the spacing or locking ring and the side sections more than by simply expanding or stretching the ring into engagement with the side sections and tensioning the latter, the ring 2 may be formed of a metal of a different elastic limit from that of the side sections 1.

For instance, the ring 2 may be formed, if desired, from a relatively lower carbon or softer steel or other metal softer than the metal from which the sections 1 are made so that it has consequently a relatively lower elastic limit. If the ring 2 is then stretched into the side sections and the stretching or expanding is carried on sufficiently to tension the side sections, they will, due to their relatively higher elastic limit, tend to contract relatively more than the ring 2 and consequently the sections 1 and the ring will be substantially stressed relative to each other. It will thus be seen that by the selection of materials the relative stress between the ring and the side sections can be varied, but even if all of these members be formed from the same metal, it has been found that a very rigid substantially one piece construction will be produced in which the stressed relation is present.

The engagement of the ribs 6 and 8 with the inclined walls of the corresponding grooves 5 and 7 can be made to be a rigid, interfitting relation throughout the periphery of the ribs and grooves. It will also be noted that a relative stress between the spacing ring 2 and the sections may be obtained if desired and in substantially the amount desired.

It will thus be seen that by our process a cushion tire structure may finally be sized to desired given dimensions to make up for any shrinkage, distortion or eccentricities that may arise from the curing operation, or from inaccurately sized side sections 1. Also if it be desired, the sections 1 may be intentionally formed slightly under-sized, and after the endless ring 2 has been stretched into proper position relative to the side sections the stretching may be continued until the sections 1 are expanded to the required size.

It is customary to apply a relatively high pressure to force a cushion tire structure laterally upon a fixed rim of a wheel structure, as the latter is usually made slightly larger in diameter than the inner diameter of the tire structure in order to insure a tight engagement and relative stress between the tire base and the fixed rim of the wheel structure. To facilitate the application of the tire base to the fixed rim the inner corners of the side sections and ring 2 may be rounded.

It will thus be seen that our base or cushion tire structure is made up of a plurality of parts, each of which will individually resist stretching whereby pressure is exerted upon the fixed rim of a wheel structure throughout substantially the entire area of the inner faces of such parts.

While we have described and shown our ring 2 as preferably endless and of one-piece, it is to be understood that it may be endless and made up of sections, or of any other construction which will permit stretching to a larger diameter and will interlock with the side sections to form a rigid tire structure.

Furthermore, it is to be understood that the particular forms of apparatus shown and described, and the particular procedure set forth, are presented for the purposes of explanation and illustration, and that various modifications of said apparatus and procedure can be made without departing from our invention as defined in the appended claims.

Having thus described our invention, what we claim is:

1. A cushion tire structure, including a substantially imperforate annular metal base or rim, comprising a plurality of endless annular sections secured together and stressed relative to each other and a cushion of rubber vulcanized on said base, said cushion being recessed from its inner periphery.

2. A tire base or rim structure, comprising a pair of annular side sections, and an endless ring engaging the inner faces of said sections, said sections and ring having cooperating engaging members, the said side sections and said endless ring being under stress relative to each other.

3. A tire base or rim structure, comprising a pair of annular side sections, and an endless ring engaging the inner faces of said sections, said sections and ring interlocking, said ring and sections being in a state of stress relative to each other, whereby a rigid base is formed.

4. A tire base or rim structure comprising a pair of annular side sections and an endless ring engaging the inner faces thereof, said sections and ring interlocking, said sections and ring being formed of steel, the steel of said ring originally having a lower elastic limit, said ring being expanded into engagement with said sections, and said sections being tensioned, whereby said sections and ring are stressed relative to each other.

In testimony whereof, we hereunto affix our signatures.

FRED R. KLAUS.
FRANK H. MEYER.